June 6, 1939.     G. F. BURGER     2,161,131
DEGREASING AND FLUSHING DEVICE
Filed May 24, 1937
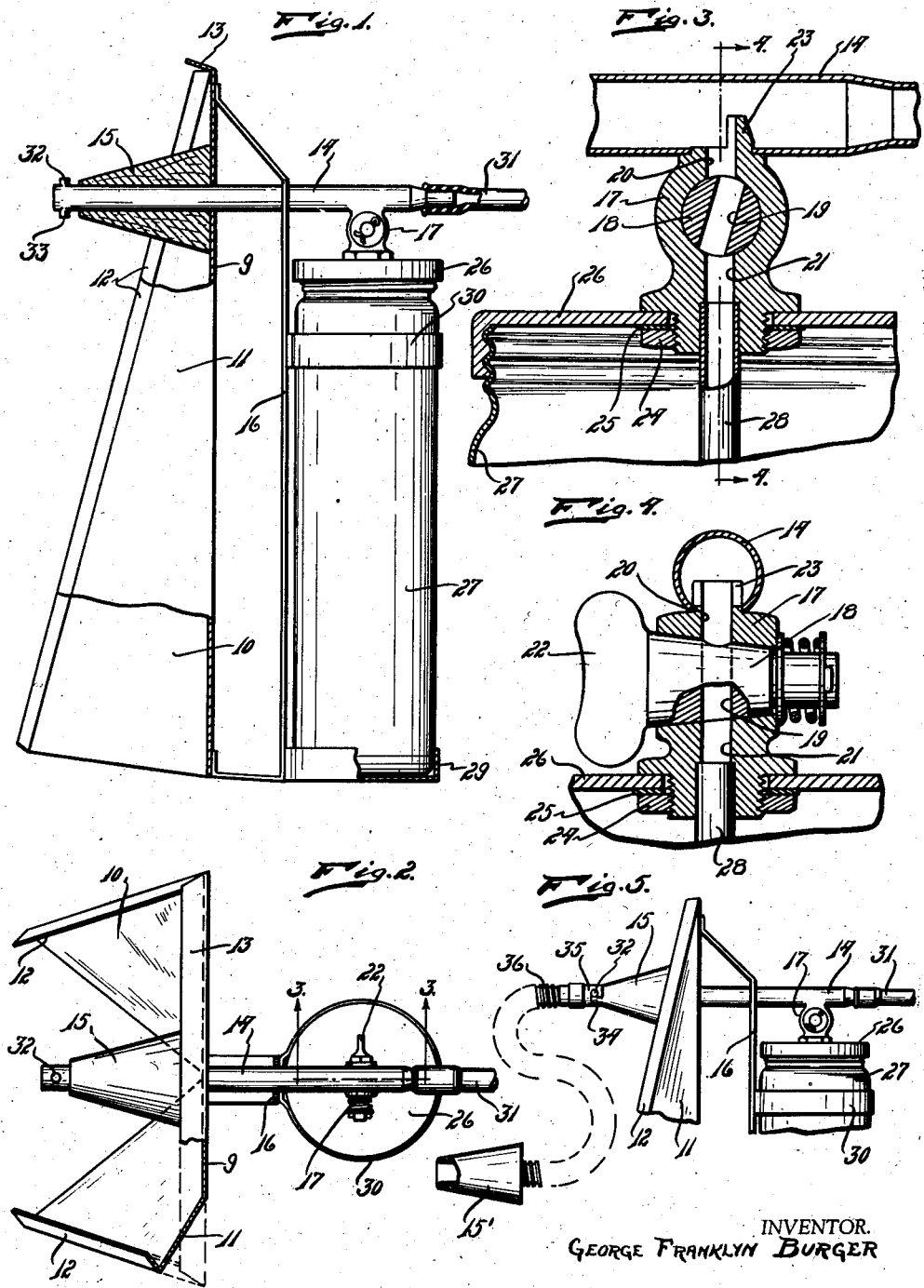
INVENTOR.
GEORGE FRANKLYN BURGER
BY
ATTORNEY.

Patented June 6, 1939

2,161,131

UNITED STATES PATENT OFFICE 2,161,131

DEGREASING AND FLUSHING DEVICE

George Franklyn Burger, Detroit, Mich.

Application May 24, 1937, Serial No. 144,465

8 Claims. (Cl. 184—1.5)

My invention relates to a new and useful improvement in a degreasing device adapted for use in cleaning out old or used grease and lubricant and dirt and other foreign material which may accumulate in the rear axle housing, the differential housing or the transmission housing, or clearing or cleaning any container.

It is an object of the present invention to provide a device which may be easily and quickly mounted in position at an opening leading into a housing so that air under pressure may be delivered into the housing to expel the grease and foreign material therefrom, or to clean any mechanisms or parts.

It is another object of the invention to provide a device of this class so arranged and constructed that it will serve as a means for protecting the operator against grease or material being splattered when the device is being operated.

It is another object of the invention to provide a device of this class in which a lubricant or cleansing fluid may be injected into a housing, or any container, together with compressed air for effecting a complete cleansing or washing of the gears and other parts contained therein.

Another object of the invention is the provision of a device of this class which will be simple in structure, economical of manufacture, durable, compact, light and easily and quickly operated.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of the invention with a part broken away and a part shown in section.

Fig. 2 is a top plan view of the invention.

Fig. 3 is a fragmentary, sectional view taken on line 3—3 of Fig. 2.

Fig. 4 is a fragmentary, sectional view taken on line 4—4 of Fig. 3.

Fig. 5 is a fragmentary, perspective view of the invention showing an attachment connected thereto.

As illustrated in the drawing, I provide a shield preferably formed from metal and comprising a back 9 which tapers from its upper edge to its lower end, this lower end terminating substantially in a point forming the vertex of a triangular formation. Bent inwardly along the edges of the back 9 are side walls 10 and 11 which are which is provided on its outer edge with a flange 12. A flange 13 is also bent inwardly on the upper edge of the back 9 so that a shield is thus provided, this shield being preferably formed from a single sheet of metal and the side walls 10 and 11 tapering toward each other at the bottom to provide a trough-shaped structure so that any grease that is splashed rearwardly against the back 9 or the walls 10 and 11 may flow downwardly toward the center thereof. Fixedly projected through the back 9, below the upper edge thereof, is a conduit 14 which carries on its inner end a conical plug 15 through which the conduit 14 extends centrally. This plug 15 may be formed from leather, rubber, wood or the like and forms a sort of conical spool-like plug which may be inserted into the opening in a differential housing, transmission housing or any container or the like, and pressed securely against the opening, for sealing against escape of grease, liquid or air therethrough.

Secured to the back 9 is a metallic bracket 16 which serves as a hand grip. Mounted on the conduit 14 is a valve housing 17 in which is rotatably mounted the valve plug 18 having the passage 19 formed therethrough for establishing, upon rotation of the plug 18 to the proper position, communication between the outlet opening 20 formed in the housing and the passage 21. The plug 18 is provided with a gripping portion 22 whereby it may be rotated. The housing 17 is extended to provide the boss 23 at the anterior side of the passage or opening 20, the anterior side being defined as the side from which the air passing through the conduit 14 will be delivered. Mounted on the housing 17 by means of the nut 24 and the washer 25, is a screw cap or cover 26, threaded into which is the open end of the screw container 27. This container may be made of metal or, if desired, it may be made from glass or any other suitable material. Threaded into the housing 17 so as to register with the passage 21, is a conduit 28 which extends to substantially the bottom 27. Mounted on and extending outwardly from the bracket 16 are the circular bands 29 and 30 which embrace and also serve to support the container 27.

In use, the container 27 would be filled with cleansing oil or liquid. The conduit 14 would then be connected to a suitable flexible tube 31 communicating with a source of air pressure. When it is desired to clean the used grease, lubricant and foreign material from the rear axle housing, differential housing any container or parts or the like, the tapered end of the member 15 would be thrust into the opening formed in the housing and held tightly thereagainst to effect a closing of the opening so as to prevent grease from being blown outwardly from the opening. The air would then be turned on to deliver air under pressure into the housing, the member 15 being preferably inserted into the filling or inlet opening formed in the housing. The plug would be removed from the usual outlet opening of the housing so that the air delivered into the housing under pressure would blow the used grease and foreign material from the housing. Were the member 15 not to effect a complete closing of the inlet opening, the shield comprising the back 9 and the side walls 10 and 11, would serve to protect the operator from being splattered from any grease which was being blown out of the inlet opening. It is believed obvious that, if desired, the container 27 might be dispensed with, but when the container 27 is present and is to be used, the valve would be opened at the proper time so that the compressed air entering the housing would draw without the cleansing fluid from the container 27 and serve to thoroughly cleanse and wash the gears within the housing. Since this liquid would be drawn from the container 27 by aspirating, it would of course be delivered into the housing in a finely atomized condition so that the proper dispersal of the cleansing fluid to all parts of the housing would be assured.

The tube 14 projects beyond the end of the tapered plug 15 and projecting outwardly from opposite sides thereof are the studs 32 and 33 which would cooperate with the bayonet slot 34 formed in the metallic fitting 35 carried by the flexible tube 36. Secured to the end of the flexible tube 36 would be a tapered plug 15' having a central passage formed therethrough in which the tube 36 may be secured. This device forms an attachment whereby a flexible connection leading from the conduit 14 may be attached in order to reach places which would be inaccessible with the shield attached in close proximity to the plug.

It is thus believed obvious that I have provided a simple and inexpensive device for cleaning mechanisms, parts, containers or housings such as transmission housing, etc., by the use of air and that I have also provided an easily and quickly operated mechanism whereby a flushing or washing of the gear within the housing or any parts may be accomplished.

It is believed obvious that the device may also be used for cleaning, by means of air or any suitable fluid under pressure, any mechanism, parts or containers from grease, oil, dirt or any foreign material and for flushing the interiors of such containers as it is not believed that this invention is limited in its utility to gear housings.

While I have illustrated and described the preferred form of construction, I do not wish to limit myself to the precise details of structure shown, but desire to avail myself of such variations and modifications as may come within the scope of the appended claims.

What I claim as new is:

1. A degreasing device of the class described, comprising: a shield forming body; deflecting side walls on said body; a delivery conduit projected through said body adjacent one end thereof and fixed thereto; a tapered plug embracing said conduit, the tapered end of said plug projecting outwardly from one face of said shield forming body, said conduit being projected through said shield forming body between said walls; a liquid receptacle; means for mounting said receptacle on said shield forming body; means for establishing communication of said receptacle with said conduit for conducting liquid from said receptacle to said conduit; and means for controlling the delivery of liquid from said receptacle to said conduit.

2. A degreasing device of the class described, comprising: a shield forming body; deflecting side walls on said body; a delivery conduit projected through said body adjacent one end thereof and fixed thereto; a tapered plug embracing said conduit, the tapered end of said plug projecting outwardly from one face of said shield forming body, said conduit being projected through said shield forming body between said walls; a liquid receptacle; means for establishing communication of said receptacle with said conduit for conducting liquid from said receptacle to said conduit; means for controlling the delivery of liquid from said receptacle to said conduit; and means secured to said body and engaging said receptacle for assisting in supporting the same.

3. A degreasing device of the class described, comprising: a shield forming body; a conduit projected through said body; trunnions projecting outwardly from opposite sides of said conduit adjacent one end thereof; a fitting for a bayonet slot adapted for engaging over said end of said conduit, said bayonet slot being adapted for reception of said trunnions for locking said fitting on said conduit; a flexible tube connected to said fitting; and a tapered plug having a central passage formed therethrough, the end of said tube being projected through said passage.

4. A degreasing device of the class described, comprising: a shield forming body; a conduit projected at one end through said body intermediate the ends thereof; a tapered plug, the tapered end thereof projecting outwardly from one face of said body, said plug having a central passage formed therethrough for reception of the projected end of said conduit, said conduit being in fixed relation to said shield forming body and adapted for attachment to an air pressure line; a handle forming member mounted on said body; a receptacle; means projecting outwardly from said handle forming member for embracing said receptacle; a cover for attachment to said receptacle; a valve housing mounted on said cover and having a passage formed therein and provided with an outlet opening adapted for registration with said passage; a tube mounted on said valve housing in communication with said passage and extending to adjacent the bottom of said receptacle and in communication therewith, the outlet opening of said valve housing communicating with the interior of said conduit; and means for controlling the communication of said passage with said opening.

5. A degreasing device of the class described, comprising: a shield forming body; a conduit projected at one end through said body intermediate the ends thereof; a tapered plug, the tapered end thereof projecting outwardly from one face of said body, said plug having a central passage formed therethrough for reception of the projected end of said conduit, said conduit being in fixed relation to said shield forming body and adapted for attachment to an air pressure line; a handle forming member mounted on said body; a receptacle; means projecting outwardly from said handle forming member for embracing said receptacle; a cover for attachment to said receptacle; a valve housing mounted on said cover and having a passage formed therein and provided with an outlet opening adapted for registration with said passage; a tube mounted on said valve housing in communication with said passage and extending to adjacent the bottom of said receptacle and in communication therewith, the outlet opening of said valve housing communicating with the interior of said conduit; means for controlling the communication of said passage with said opening; and a deflecting member mounted on said valve housing and projected into said conduit anterior of the position of said opening in said valve housing.

6. A degreasing device of the class described, comprising: a shielding member having a planal portion; a conduit projecting through the planal portion of said member and terminating outwardly from the forward face thereof; a handle mounted on the rearward face of said planal portion; and receptacle supporting means carried by said handle.

7. In a device of the class described: a shielding member having a central portion; a conduit projecting through the central portion of said member and terminating outwardly from the forward face thereof; a handle mounted on the rearward face of said central portion; and receptacle supporting means carried by said handle.

8. A device of the class described, comprising: a shield forming body; a conduit projected at one end through said body, intermediate the ends thereof; a tapered plug, the tapered end thereof projecting outwardly from one face of said body, said plug having a central passage formed therethrough for reception of the projected end of said conduit, said conduit being in fixed relation to said shield forming body and adapted for attachment to an air pressure line; a receptacle; means for mounting said receptacle on said shield forming body; a cover for attachment to said receptacle; a valve housing mounted on said cover and having a passage formed therein and provided with an outlet opening adapted for registration with said passage; a tube mounted on said valve housing in communication with said passage and extending to adjacent the bottom of said receptacle and in communicating therewith, the outlet opening of said valve housing communicating with the interior of said conduit; and means for controlling the communication of said passage with said opening.

GEORGE FRANKLYN BURGER.